(12) United States Patent
Chan

(10) Patent No.: US 12,445,031 B2
(45) Date of Patent: Oct. 14, 2025

(54) CONVERTER APPARATUS AND CONTROL METHOD

(71) Applicant: Murata Manufacturing Co., Ltd., Nagaokakyo (JP)

(72) Inventor: Chukhung Chan, Shatin (CN)

(73) Assignee: MURATA MANUFACTURING CO., LTD., Kyoto (JP)

( * ) Notice: Subject to any disclaimer, the term of this patent is extended or adjusted under 35 U.S.C. 154(b) by 217 days.

(21) Appl. No.: 18/370,694

(22) Filed: Sep. 20, 2023

(65) Prior Publication Data

US 2024/0106315 A1    Mar. 28, 2024

(30) Foreign Application Priority Data

Sep. 23, 2022   (CN) .......................... 202211165317.1

(51) Int. Cl.
*H02M 3/156* (2006.01)
*H02M 1/00* (2006.01)
*H02M 1/14* (2006.01)

(52) U.S. Cl.
CPC ......... *H02M 1/0003* (2021.05); *H02M 3/156* (2013.01); *H02M 1/14* (2013.01)

(58) Field of Classification Search
CPC .... H02M 3/1582; H02M 3/156; H02M 3/157; H02M 3/158; H02M 3/1584; H02M 3/1586; H02M 3/285; H02M 3/33561; H02M 7/49; H02M 1/045; H02M 7/006; H02M 7/06; H02M 7/068; H02M 7/153; H02M 7/10; H02M 1/083; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 1/007; H02M 1/0009; H02M 1/0095; H02M 1/08; H02M 1/088;
(Continued)

(56) References Cited

U.S. PATENT DOCUMENTS 9,692,305 B2 *   6/2017   Yan ...................... H02M 3/285
9,906,072 B2 *   2/2018   Smith ..................... H02J 9/061
(Continued)

*Primary Examiner* — Jeffrey A Gblende
(74) *Attorney, Agent, or Firm* — Keating & Bennett, LLP

(57) ABSTRACT

A method of controlling a converter apparatus operable based on a first frequency modulation control signal and at least one second frequency modulation control signal, includes determining updated periods of the first frequency modulation control signal and the at least one second frequency modulation control signal based on the output, for each second frequency modulation control signal, at a beginning of each period of the first frequency modulation control signal, determining a phase shift of the second frequency modulation control signal relative to the first frequency modulation control signal, when a difference between the phase shift and a target phase shift exceeds a predetermined threshold, determining the period of the second frequency modulation control signal as the updated period increased or decreased by a predetermined amplitude, otherwise determining the period of the second frequency modulation control signal as the updated period.

19 Claims, 6 Drawing Sheets

(58) Field of Classification Search
CPC .... H02M 3/1588; H02M 7/5395; H02M 1/14; H02M 1/0043; H02M 1/0074; H02M 1/0077; H02M 1/0003; H02J 3/46; H02J 3/38
See application file for complete search history.

(56) References Cited

U.S. PATENT DOCUMENTS

2013/0088899 A1* 4/2013 Iwata .................. H02M 1/4225
363/70
2014/0232368 A1* 8/2014 Dally .................. H02M 3/1584
323/311

\* cited by examiner

CONVERTER APPARATUS AND CONTROL METHOD

CROSS REFERENCE TO RELATED APPLICATIONS

This application claims the benefit of Chinese Patent Application No. 202211165317.1 filed on Sep. 23, 2022. The entire contents of this application are hereby incorporated herein by reference.

BACKGROUND OF THE INVENTION

1. Field of the Invention

The present disclosure relates to a field of frequency modulation control, in particular, to a method and an apparatus for changing a period of a multi-phase frequency modulation control signal.

2. Description of the Related Art

A converter, such as a switching power converter, generally uses a frequency modulated control signal to regulate an output of the converter. The converter may be connected between an input and an output to convert the input to an expected output. The output of the converter may be fed back to a controller, and the controller generates a frequency modulated control signal to drive the converter and to regulate the output. When the converter is operating, a frequency of the control signal is continuously adjusted by the controller based on changes of an input voltage or current level, a target output level, an output load condition, and the like.

In order to achieve high power and high efficiency, some applications generally use two or more converters operating in parallel and use separate frequency modulated control signals to control individual converters. Since the outputs of the converters are joined together, the control signals of individual converters should have the same frequency. However, phase shifts between control signals are also controlled at the same time to optimize converter performance. For an example of a two-phase LLC converter, two control signals vary based on line/load conditions and regulate a common output. Their frequencies are almost the same, but the two control signals always need to keep a 90° phase shift so that the output ripple currents from the two converters may be best cancelled with their respective outputs. When the frequency of the control signals of each converter is constantly adjusted according to changes, it is difficult to maintain a stable phase shift between the control signals.

Therefore, there is a need to provide an effective method to maintain a phase shift of a multi-phase frequency modulation control signal.

SUMMARY OF THE INVENTION

Preferred embodiments of the present invention provide converter apparatuses and control methods, which may maintain a phase shift of a frequency modulation control signal in an event of a frequency change in the frequency modulation control signal.

A preferred embodiment of the present invention provides a method of controlling a converter apparatus. The converter apparatus includes a first switching converter and at least one second switching converter, the first switching converter and the at least one second switching converter are connected in parallel between an input and an output and are operable based on a first frequency modulation control signal and at least one second frequency modulation control signal, respectively.

The method includes determining an updated period of the first frequency modulation control signal and of the at least one second frequency modulation control signal based on the output, for each second frequency modulation control signal of the at least one second frequency modulation control signal, at a beginning of each period of the first frequency modulation control signal, determining a phase shift of each second frequency modulation control signal relative to the first frequency modulation control signal, and changing the period of each second frequency modulation control signal based on the determined phase shift by, when a difference between the phase shift and a target phase shift exceeds a predetermined threshold, determining the period of each second frequency modulation control signal as the updated period increased or decreased by a predetermined amplitude, and when the difference between the phase shift and the target phase shift is less than or equal to the predetermined threshold, determining the period of each second frequency modulation control signal as the updated period.

According to preferred embodiments of the present invention, before determining the phase shift, the period of the first frequency modulation control signal is changed to the updated period.

According to preferred embodiments of the present invention, determining the period of each second frequency modulation control signal as the updated period increased or decreased by the predetermined amplitude includes determining the period of each second frequency modulation control signal as the updated period increased or decreased by a predetermined amplitude along a direction where the phase shift approaches the target phase shift at a next period.

According to preferred embodiments of the present invention, the method further includes subtracting the phase shift from the target phase shift to obtain a phase difference EPSD, wherein if the EPSD is less than zero, the EPSD is converted to a value greater than zero by adding one updated period.

According to preferred embodiments of the present invention, wherein the predetermined amplitude is a fixed value less than the predetermined threshold.

According to preferred embodiments of the present invention, the predetermined amplitude is variable.

According to preferred embodiments of the present invention, the predetermined amplitude is obtained by multiplying K with a period corresponding to the EPSD, wherein K is a constant between 0 and 1.

According to preferred embodiments of the present invention, wherein K is a constant between about 0.2 and about 0.4, for example.

According to a preferred embodiment of the present invention, the method further includes, when the EPSD is less than half of a phase shift corresponding to the updated period, determining the period of each second frequency modulation control signal as the updated period in response to the EPSD being less than the predetermined threshold, otherwise, determining the period of each second frequency modulation control signal as the period of the updated period decreased by the predetermined amplitude, and when the EPSD is greater than or equal to half of the phase shift corresponding to the updated period, determining the period of each second frequency modulation control signal as the updated period in response to the EPSD being greater than the phase shift corresponding to the updated period subtracted by the predetermined threshold, otherwise, determining the period of the second frequency modulation control signal as the updated period increased by the predetermined amplitude.

According to a preferred embodiment of the present invention, if the at least one second switching converter includes only one second switching converter between the input and the output, the method further includes, after determining the period of the second frequency modulation control signal as the updated period increased or decreased by the predetermined amplitude, determining the period of the first frequency modulation control signal as the updated period decreased or increased by the predetermined amplitude, and after determining the period of the second frequency modulation control signal as the updated period, determining the period of the first frequency modulation control signal as the updated period.

According to a preferred embodiment of the present invention, the method further includes, after determining the period of the second frequency modulation control signal as the updated period decreased by the predetermined amplitude, determining the period of the first frequency modulation control signal as the updated period increased by the predetermined amplitude, and after determining the period of the second frequency modulation control signal as the updated period increased by the predetermined amplitude, determining the period of the first frequency modulation control signal as the updated period decreased by the predetermined amplitude.

According to a preferred embodiment of the present invention, the first frequency modulation control signal and the at least one second frequency modulation control signal are generated using separate timers, respectively.

A preferred embodiment of the present invention provides a converter apparatus, including a first switching converter and at least one second switching converter connected in parallel between an input and an output, and operable based on a first frequency modulation control signal and at least one second frequency modulation control signal, respectively, and a controller configured or programmed to determine an updated period of the first frequency modulation control signal and of the at least one second frequency modulation control signal based on the output, for each second frequency modulation control signal of the at least one second frequency modulation control signal, at a beginning of each period of the first frequency modulation control signal, determine a phase shift of each second frequency modulation control signal relative to the first frequency modulation control signal, and change the period of each second frequency modulation control signal based on the determined phase shift by, when a difference between the phase shift and a target phase shift exceeds a predetermined threshold, determining the period of each second frequency modulation control signal as the updated period increased or decreased by a predetermined amplitude, and when the difference between the phase shift and the target phase shift is less than or equal to the predetermined threshold, determining the period of each second frequency modulation control signal as the updated period.

According to a preferred embodiment of the present invention, the controller is configured or programmed to perform any method disclosed herein.

A preferred embodiment of the present invention provides a computer program including instructions, and the instructions, when executed by a processing circuit of a controller, cause the controller to perform the method disclosed herein.

A preferred embodiment of the present invention provides a non-transitory computer readable medium including a computer program stored thereon, the computer program includes instructions, and the instructions, when executed by a processing circuit of a controller, cause the controller to perform the method disclosed herein.

According to a preferred embodiment of the present invention, by changing a period of a multi-phase frequency modulation control signal, a phase shift of the multi-phase frequency modulation control signal may be maintained to eliminate an output ripple current of a switching converter.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described below with reference to the accompanying drawings. It should be understood, however, that these descriptions are merely exemplary and are not intended to limit the scope of the present disclosure. In addition, in the following descriptions, descriptions of well-known structures and technologies are omitted to avoid unnecessarily obscuring the concept of the present disclosure.

Terms used herein are for the purpose of describing preferred embodiments only and are not intended to limit the present disclosure. The words "one", "a (an)" and "the" used herein should also include the meanings of "more" and "a plurality of", unless the context clearly indicates otherwise. In addition, terms "comprising", "including", and the like used herein specify a presence of the feature, step, operation, and/or component, but do not preclude a presence or addition of one or more other features, steps, operations, or components.

All terms (including technical and scientific terms) used herein have the meaning as commonly understood by those skilled in the art, unless otherwise defined. It should be noted that the terms used herein should be construed to have meanings consistent with the context of the present description and should not be construed in an idealized or overly rigid manner.

FIG. 1 shows a schematic diagram of an example converter apparatus according to a preferred embodiment of the present invention.

Figure 1:
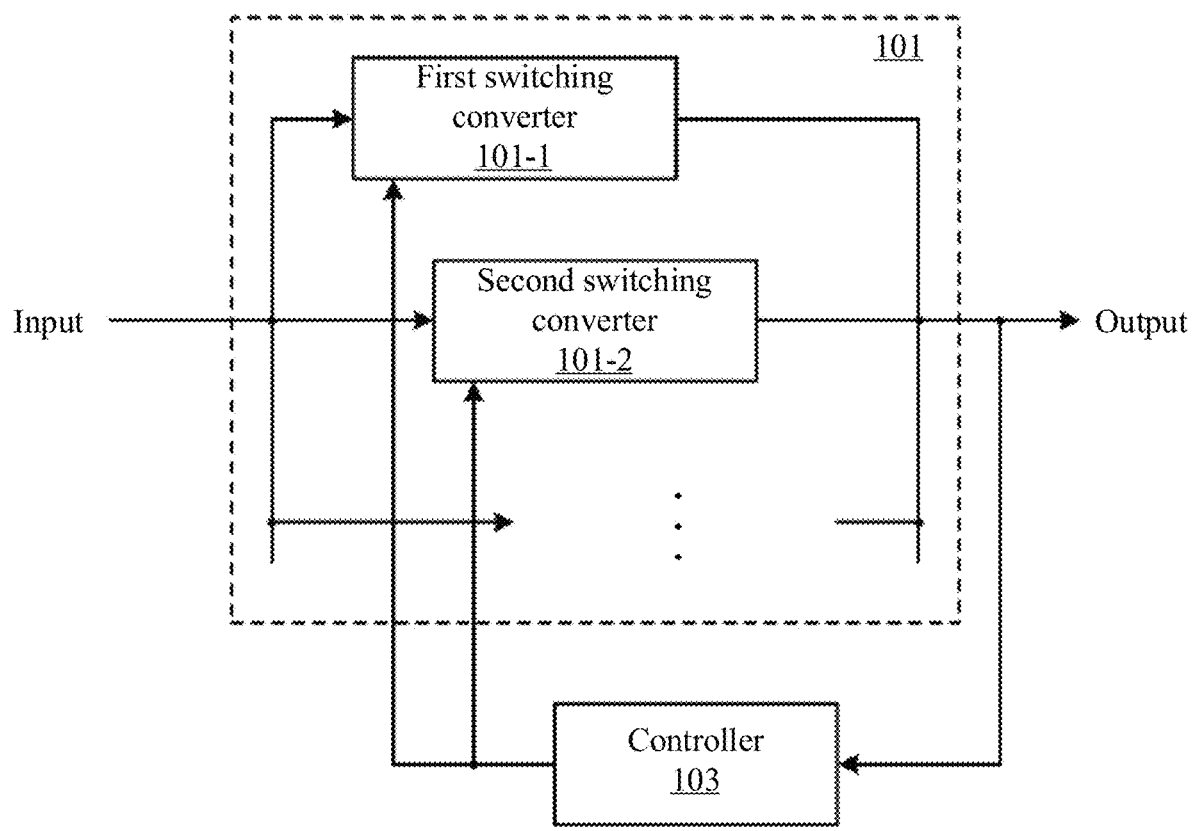
FIG. 1 shows a schematic diagram of an example converter apparatus according to a preferred embodiment of the present invention.

As shown in FIG. 1, a converter apparatus 100 according to a preferred embodiment of the present invention may include a converter 101 and a controller 103.

The converter 101 is connected between an input and an output to convert the input to an expected output. For example, the converter 101 may be a switching converter that converts the input to the expected output through a switching action. For example, the converter 101 may include an active component and may store energy during a conductive period and release the stored energy during a cutoff period.

In order to achieve high power and high efficiency, the converter 101 may include two or more converters connected in parallel between the input and the output (therefore, the converter 101 may be referred to as a multi-phase converter). A first switching converter 101-1 and a second switching converter 101-2 are schematically shown in FIG. 1 as examples. Certainly, the converter 101 may also include fewer (e.g., single) or more (e.g., three or more) (switching) converters. The first switching converter 101-1 and the second switching converter 101-2 may include the same or different configurations, such as an LLC converter.

The controller 103 may control the operation of the converter 101. According to a preferred embodiment of the present invention, the controller 103 may use a pulse frequency modulation (PFM) solution to control the converter 101. More specifically, the controller 103 may control the switching frequency of the converter 101 to achieve an expected output. When, for example, an input voltage or current level, output load, and other conditions are changed, or an expected output level is changed, the controller 103 may increase or decrease the switching frequency of the converter 101 to maintain the output at an expected level. For example, the controller 103 may adjust the switching frequency of the converter 101 (specifically, the first switching converter 101-1 and the second switching converter 101-2) based on digital control theories such as proportional integral differential (PID) and two-pole, two-zero control.

In a case of the multi-phase converter, the controller 103 may generate the multi-phase frequency modulation control signal, including corresponding frequency modulation control signals for different converters in the converter 101, such as the first switching converter 101-1 and the second switching converter 101-2, to respectively control their switching actions. The frequency modulation control signals for different converters should generally have substantially the same frequency and relatively fixed phase shift.

The controller 103 may include a processor or microprocessor, a field programmable gate array (FPGA), an application specific integrated circuit (ASIC), a microcontroller unit (MCU), etc., which may run instructions to perform various operations described in this disclosure. The preferred embodiments of the present invention will be described in this disclosure with reference to multi-phase power converters and MCUs, but this disclosure is not limited to this.

In a case that the controller 103 is implemented by MCU, a timer may be used to control a period (and therefore frequency) of the control signal. For example, the timer may be implemented as a counter that increments at a predetermined rate (incremental step). A count value of the timer may start from 0, increment at a predetermined rate, and may be reset to zero when reaching a predefined count value (period count, PerCnt). Corresponding to a time period from 0 to PerCnt, the controller 103 generates one period of the control signal. After the count value reaches the predefined count value PerCnt, the count value is reset to zero and therefore enters a next period. Therefore, in this case, the period (or frequency) of the control signal may be equivalent to the predefined count value PerCnt of the timer. In the PFM solution, controlling the switching frequency may be seen as adjusting the predefined count value PerCnt.

Figure 2A:
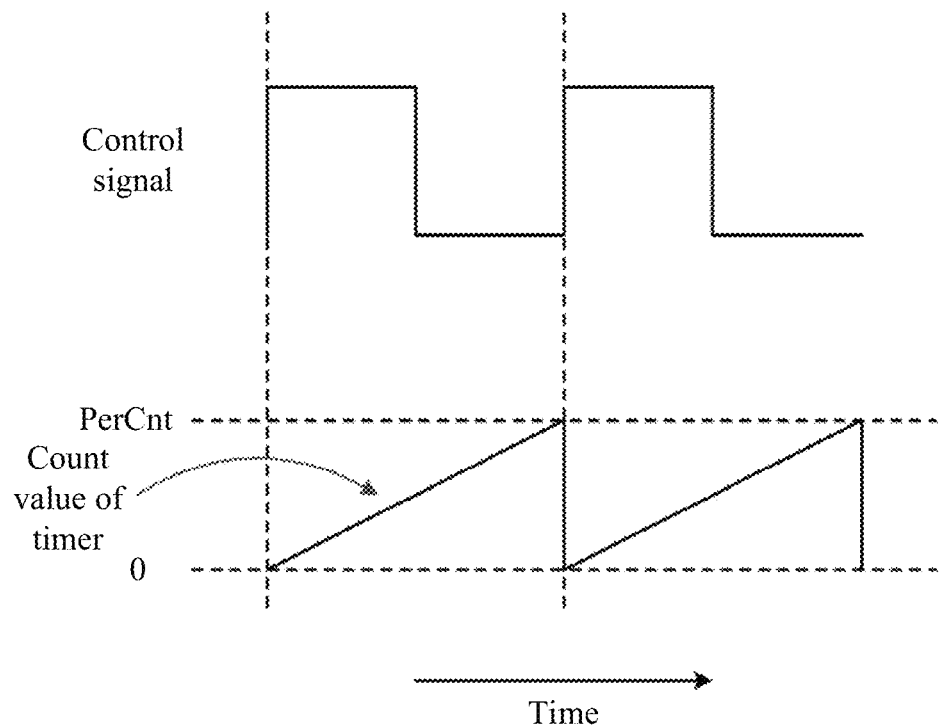
FIGS. 2A and 2B show schematic diagrams of a control signal frequency and a timer value according to a preferred embodiment of the present invention.
Figure 2B:
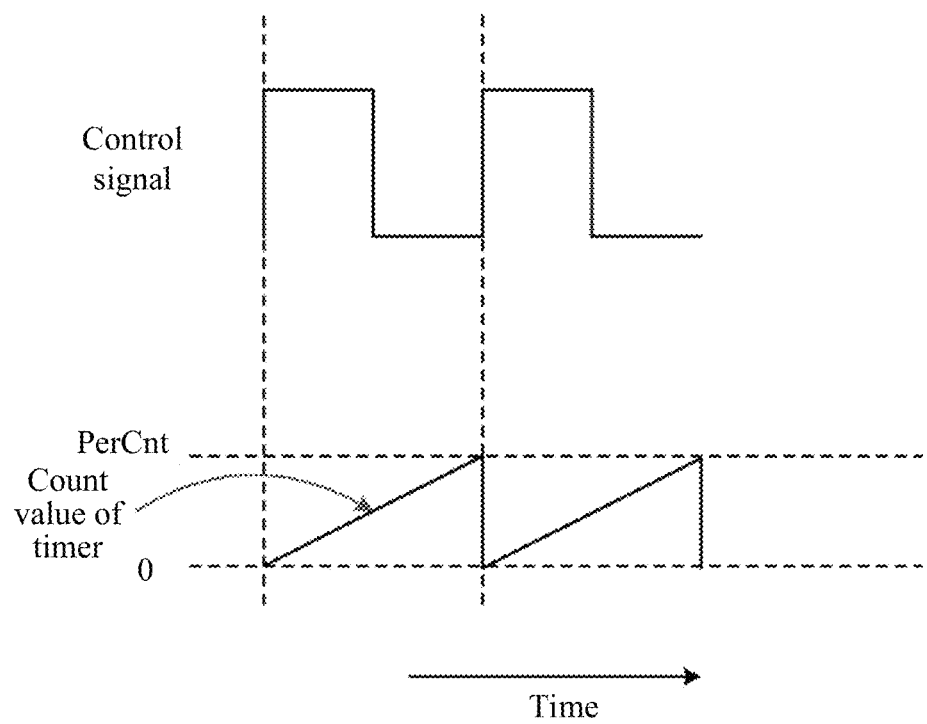

FIGS. 2A and 2B show schematic diagrams of a relationship between a control signal period and a timer count value according to a preferred embodiment of the present invention.

As shown in FIG. 2A, the count value of the timer is incremented, for example, every 1 ns (incremental step=1 ns/count). The control signal cycle starts at timer value=0 and ends at timer value=10000 (PerCnt=10000). At the end of the control signal cycle, another cycle begins and the timer value is immediately reset to 0. Then, the generated control signal will have a period equal to 1 ns×10000=10 μs (i.e., the frequency is 100 kHz).

The control signal may be a pulse signal with a period corresponding to PerCnt, such as a square wave signal. For example, in a high-level period of the square wave signal, the corresponding converter may be in an "on" state (where the active component may receive input and store energy), while in a low-level period of the square wave signal, the corresponding converter may be in an "off" state (where the active component releases stored energy). Therefore, the converter may perform switching actions with the square wave signal. The control signal may have a fixed duty cycle (such as 50% or other values).

By changing the value of PerCnt, the period (frequency) of the control signal may be changed.

As shown in FIG. 2B, if PerCnt is changed to, for example, 7500, then the period of the control signal is correspondingly changed to 1 ns×7500=7.5 μs (i.e., the frequency is approximately 133.3 kHz).

Here, the incremental step (e.g. 1 ns/count) of the timer may remain unchanged, despite a change in PerCnt. In addition, although the count value of the timer is shown as continuously changing in FIGS. 2A and 2B, it is only for the convenience of the illustration, and the count value is actually, for example, a step change signal that increases by 1 every 1 ns.

In a case of the multi-phase converter, the periods of each individual converter, such as the first switching converter 101-1 and the second switching converter 101-2, may be the same or substantially the same within manufacturing and/or measurement tolerances but the phases may be different (the phase shifts between each other may remain fixed or substantially fixed within manufacturing and/or measurement tolerances). Therefore, corresponding timers may be set for each individual converter, and the periods of each timer may be the same or substantially the same (i.e., the predefined count value PerCnt may be the same or substantially the same), with a certain phase shift between them.

In the PFM solution, the controller 103 may adjust the predefined count value PerCnt (or the period or frequency of the control signal) of the timer based on the output and according to, for example, the digital control theory mentioned above, to maintain the output at the expected level. The predefined count values PerCnt of each timer (or the period or frequency of the control signal) may be easily changed by the controller 103, such as setting the predefined count value PerCnt to the control signal period count CtrlPerCnt recalculated based on the digital control theory. However, the phase shift between each timer (or the phase shift between the control signals) may change during the period change.

According to a preferred embodiment of the present invention, in order to keep the phase shift between converters in an expected value when the period of the control signal changes, the period of the control signal may be slightly deviated from the period corresponding to the control signal period count CtrlPerCnt to be achieved, for example, slightly increased or decreased.

The examples shown in FIGS. 2A and 2B are still used as examples for description. For example, the first switching converter 101-1 and the second switching converter 101-2 both perform switching actions with a period of 10 μs (PerCnt=10000) (see FIG. 2A), and the phase of the first switching converter 101-1 is 90° lagging the phase of the second switching converter 101-2. In this case, the time when the timer count value of the first switching converter 101-1 reaches 0 should be ¼ period (i.e., 2.5 μs) later than the time when the timer count value of the second switching converter 101-2 reaches 0. When the controller 103 determines that the switching period is to be changed to 7.5 μs at the beginning of a certain period of the first switching converter 101-1 (referring to FIG. 2B), the predefined count value PerCnt of the timer of the first switching converter 101-1 may be set to CtrlPerCnt (=7500) (theoretically, the predefined count value PerCnt of the timer of the second switching converter 101-2 should also be set to the same CtrlPerCnt). However, compared to the start time of the period, the corresponding period of the second switching converter 101-2 has already started by 2.5 μs. At this point, the phase shift between them is (2.5 μs÷7.5 μs)×360°=120° (the second switching converter 101-2 is leading), deviating from the expected 90° phase shift (i.e., the first switching converter lags behind more, or says the second switching converter leads more). For example, the period of the second switching converter 101-2 may be relatively increased (by setting the predefined count value PerCnt of the corresponding timer to CtrlPerCnt+Δ, Δ is a predetermined value or variable as described below), thus the next period of the second switching converter 101-2 will start later (an amount of lead relative to the first switching converter is reduced). In this way, the phase shift between the first switching converter 101-1 and the second switching converter 101-2 may be reduced from 120°, and after several periods of such processing, the phase shift may approach or even reach 90°.

It should be noted that the phase shift is a relative value. For example, the phase shift of 90° and the phase shift of (90°±n·360°) are physically the same (where n is a natural number).

Due to the relative nature of the phase shift, the second switching converter 101-2 leading by 90° phase shift above may also be considered as the second switching converter 101-2 lagging by 360°−90° (=270°) phase. After changing the period, the second switching converter 101-2 lags by 360°−120° (=240°) phase (i.e., the second switching converter lags less). By setting the predefined count value PerCnt of the timer of the second switching converter 101-2 to CtrlPerCnt+Δ as described above, the next period of the second switching converter 101-2 may start later (an amount of lag relative to the first switching converter is increased). In this way, the phase shift between the first switching converter 101-1 and the second switching converter 101-2 may be increased from 240°, and after several periods of such processing, the phase shift may approach or even reach 270°.

In addition, due to the relative nature of the phase, the approximation of the target phase shift (leading by 90° or lagging by 270°) is not limited to setting the predefined count value PerCnt of the timer to CtrlPerCnt+Δ, but may also be achieved by setting the predefined count value PerCnt of the timer to CtrlPerCnt−Δ. For example, compared to the second switching converter 101-2 leading by 90° phase before changing the period, the second switching converter 101-2 lags by 360°−120° (=240°) phase after changing the period. By setting the predefined count value PerCnt of the timer of the second switching converter 101-2 to CtrlPerCnt−Δ, the next period of the second switching converter 101-2 may start earlier (an amount of lag relative to the phase of the first switching converter is decreased). In this way, the phase lag amount of the phase of the second switching converter 101-2 may gradually be reduced from lagging by 240°, to catch up with and even overtake the first switching converter 101-1 after several periods, and lead by nearly 90° or even reaching 90°.

Whether to set the predefined count value PerCnt of the timer to CtrlPerCnt−Δ or CtrlPerCnt+Δ may depend on the specific situation, such as approaching the target phase shift faster. Certainly, in the above-mentioned example, setting the value to CtrlPerCnt+Δ (only 30° phase shift needs to be changed, i.e., from leading by 120° to leading by 90°) is better than setting the value to CtrlPerCnt−Δ (330° phase shift needs to be changed, i.e., from lagging by 240° to leading by 90°).

Figure 3:
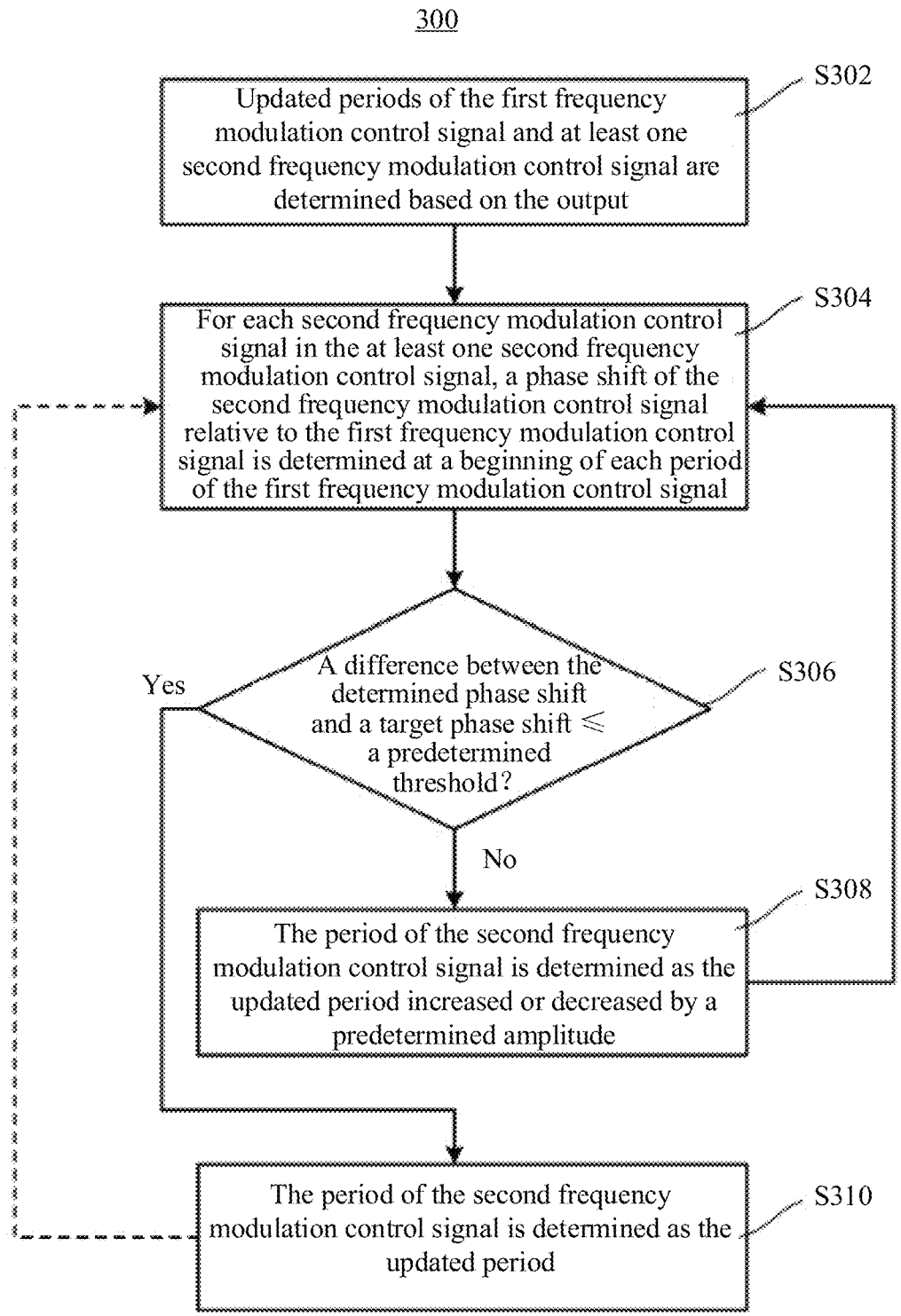
FIG. 3 shows a flowchart of a method for changing a period of a multi-phase frequency modulation control signal according to a preferred embodiment of the present invention.

FIG. 3 shows a flowchart of a method 300 of changing a period of a multi-phase frequency modulation control signal according to a preferred embodiment of the present invention. The method 300 may be executed by a controller (such as the controller 103 in FIG. 1). The multi-phase frequency modulation control signal includes a first frequency modulation control signal for a first switching converter (such as the first switching converter 101-1 in FIG. 1) and at least one second frequency modulation control signal for at least one second switching converter (such as the second switching converter 101-2 in FIG. 1).

As shown in FIG. 3, at step S302, updated periods of the first frequency modulation control signal and at least one second frequency modulation control signal are determined based on the output.

At step S304, for each second frequency modulation control signal in the at least one second frequency modulation control signal, a phase shift of the second frequency modulation control signal relative to the first frequency modulation control signal is determined at a beginning of each period of the first frequency modulation control signal.

According to a preferred embodiment of the present invention, before determining the phase shift, i.e., before step S304, the period of the first frequency modulation control signal may be changed to the updated period.

At step S306, it is determined whether a difference between the phase shift and a target phase shift exceeds a predetermined threshold.

At step S308, when the difference between the phase shift and the target phase shift exceeds the predetermined threshold, the period of the second frequency modulation control signal is determined as the updated period increased or decreased by a predetermined amplitude.

According to a preferred embodiment of the present invention, determining the period of the second frequency modulation control signal as the updated period increased or decreased by the predetermined amplitude may include: determining the period of the second frequency modulation control signal as the updated period increased or decreased by a predetermined amplitude along a direction where the phase shift approaches the target phase shift at a next period.

At step S310, when the difference between the phase shift and the target phase shift is less than or equal to the predetermined threshold, the period of the second frequency modulation control signal is determined as the updated period.

According to a preferred embodiment of the present invention, a phase difference EPSD may be obtained by subtracting the phase shift from the target phase shift. If the EPSD is less than zero, the EPSD is converted to a value greater than zero by adding one updated period.

According to a preferred embodiment of the present invention, the predetermined amplitude may be a fixed value, and the fixed value is less than the predetermined threshold.

According to a preferred embodiment of the present invention, the predetermined amplitude may be a variable.

According to a preferred embodiment of the present invention, the predetermined amplitude may be obtained by multiplying K with a period corresponding to the EPSD, and K is a constant between 0 and 1.

According to a preferred embodiment of the present invention, the method 300 further includes: when the EPSD is less than half of the phase shift corresponding to the updated period, determining the period of the second frequency modulation control signal as the updated period in response to the EPSD being less than the predetermined threshold, otherwise, determining the period of the second frequency modulation control signal as the period of the updated period decreased by the predetermined amplitude; and when the EPSD is greater than or equal to half of the phase shift corresponding to the updated period, determining the period of the second frequency modulation control signal as the updated period in response to the EPSD being greater than the phase shift corresponding to the updated period subtracted by the predetermined threshold, otherwise, determining the period of the second frequency modulation control signal as the updated period increased by the predetermined amplitude.

According to a preferred embodiment of the present invention, in a case that there is only one second switching converter between the input and the output, the method 300 further includes: after determining the period of the second frequency modulation control signal as the updated period decreased by the predetermined amplitude, determining the period of the first frequency modulation control signal as the updated period increased by the predetermined amplitude; after determining the period of the second frequency modulation control signal as the updated period increased by the predetermined amplitude, determining the period of the first frequency modulation control signal as the updated period decreased by the predetermined amplitude; and after determining the period of the second frequency modulation control signal as the updated period, determining the period of the first frequency modulation control signal as the updated period.

According to a preferred embodiment of the present invention, the first frequency modulation control signal and the at least one second frequency modulation control signal are generated using separate timers, respectively.

Figure 4:
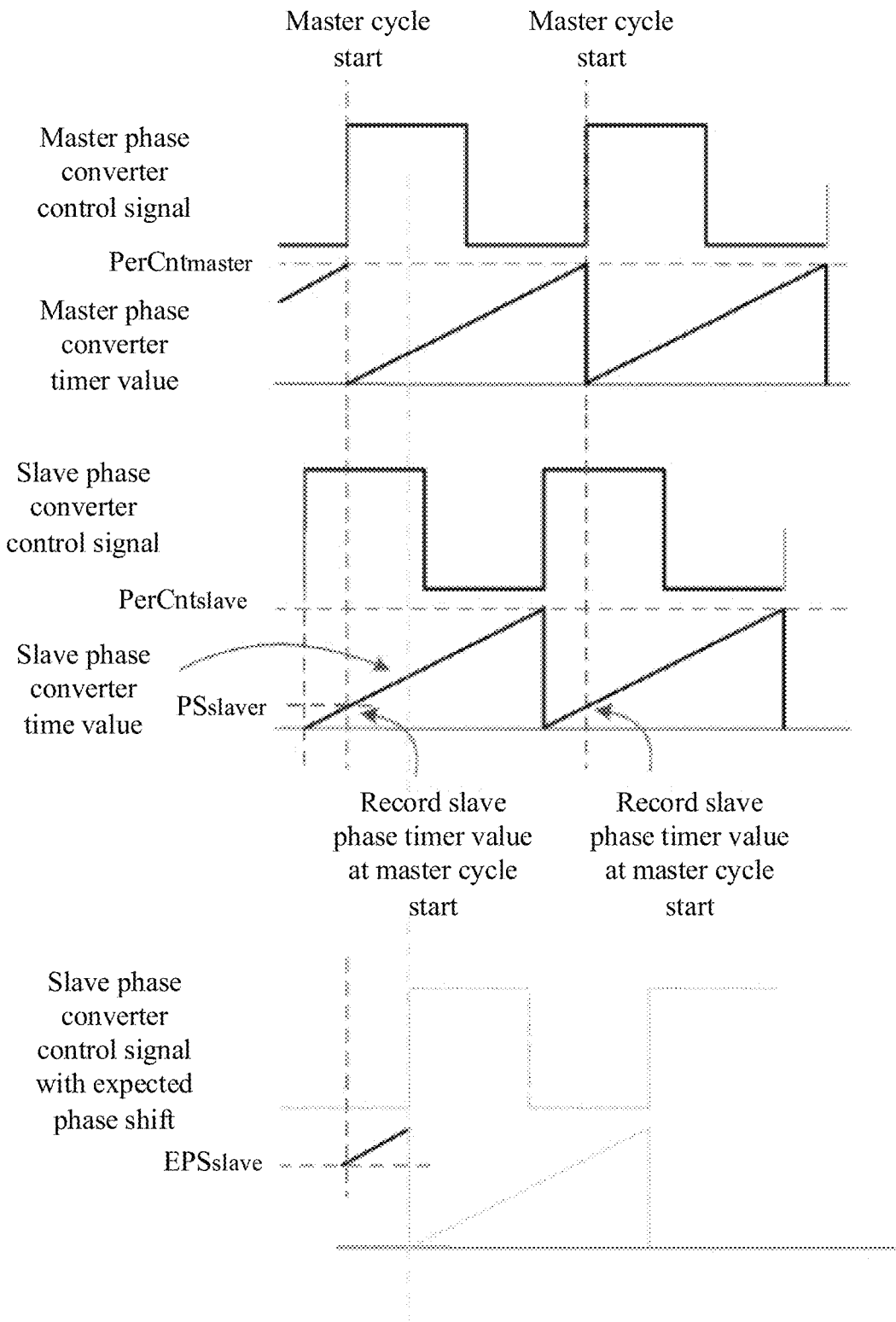
FIG. 4 shows a schematic diagram of a phase shift of a multi-phase frequency modulation control signal according to a preferred embodiment of the present invention.

FIG. 4 shows a schematic diagram of a phase shift of a multi-phase frequency modulation control signal according to a preferred embodiment of the present invention. In some preferred embodiments, in order to achieve phase shift control, one phase converter (such as the first switching converter 101-1) is selected as a master phase converter, and the predefined count value of its timer is set to $PerCnt_{master}$. The other phase converter (such as the second switching converter 101-2) are slave phase converters, and the predefined count value of its timer is set to $PerCnt_{slaveX}$, where X is an integer (1, 2, 3 . . . ), representing different number of the slave phase converters. At the beginning of each period of the master phase converter control signal, the timer values of the slave phase converters are recorded. These timer values represent the current phase shift $PS_{slaveX}$ of the slave phase converters relative to the master phase converter. The expected phase shift of each slave phase converter may be deduced from the calculated control signal period count CtrlPerCnt.

The method of changing the period of the multi-phase frequency modulation control signal will be described in detail below with reference to FIGS. 5 and 6.

Figure 5:
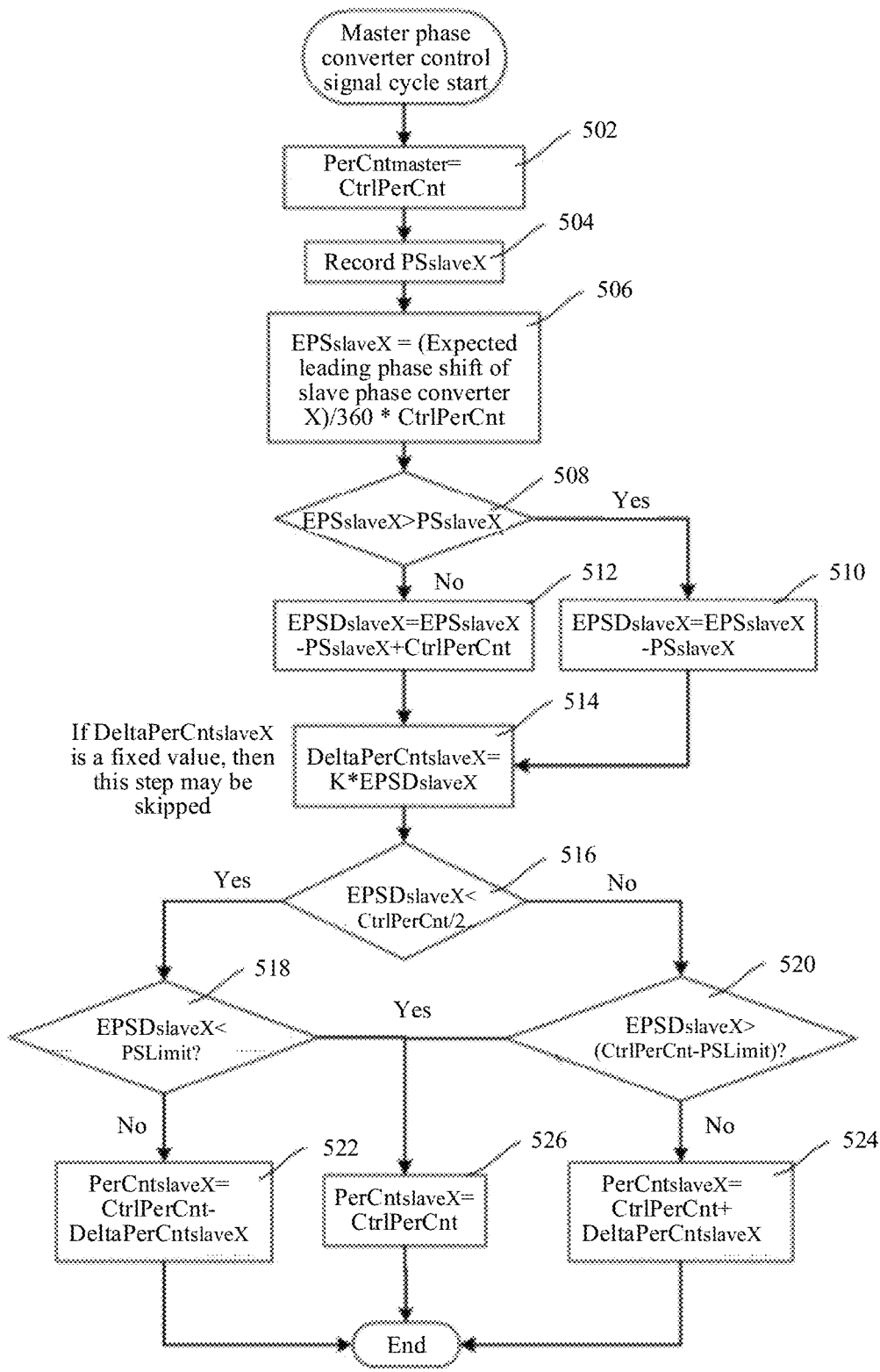
FIG. 5 shows a flowchart of an operation during each period of a master phase converter control signal according to a preferred embodiment of the present invention.

FIG. 5 shows a flowchart of an operation during each period of a master phase converter control signal according to a preferred embodiment of the present invention. In some preferred embodiments, the predefined count value PerCnt of the timer of the master phase converter only needs to follow the controller output, that is, at block 502, $PerCnt_{master}$=CtrlPerCnt. At the beginning of each cycle of the master phase converter control signal, the timer value $PS_{slaveX}$ of the slave phase converters are recorded (block 504).

According to a preferred embodiment of the present invention, the expected timer value of the slave phase converters at the beginning of the cycle of the master phase converter control signal may be calculated, $EPS_{slaveX}$=(expected leading phase shift of the slave phase converter X)/360*CtrlPerCnt (block 506). For example, one slave phase converter is expected to have 270° phase shift leading the master phase converter (or 90° phase shift lagging the master phase converter). Then $EPS_{slave1}$=(¾)*CtrlPerCnt.

Next, the phase difference from the expected timer value is defined as $EPSD_{slaveX}$=$EPS_{slaveX}$−$PS_{slaveX}$. At block 508, whether $EPS_{slaveX}$ is greater than $PS_{slaveX}$ is determined. If $EPS_{slaveX}$>=$PS_{slaveX}$, then $EPSD_{slaveX}$=$EPS_{slaveX}$−$PS_{slaveX}$ (block 510). If $EPS_{slaveX}$<$PS_{slaveX}$, then $EPSD_{slaveX}$=$EPS_{slaveX}$−$PS_{slaveX}$+CtrlPerCnt (block 512).

In order to drive the phase shift to the expected timer value, an incremental period count $DeltaPerCnt_{slaveX}$ is added to or subtracted from the new control signal period count of the slave phase converters. In some preferred embodiments, $DeltaPerCnt_{slaveX}$ may be a fixed value or a variable calculated by $K*EPSD_{slaveX}$, where K is a constant value between 0 and 1.

At block 514, $DeltaPerCnt_{slaveX}$=$K*EPSD_{slaveX}$. In some preferred embodiments, if $DeltaPerCnt_{slaveX}$ is a fixed value, this step may be skipped.

At block 516, whether $EPSD_{slaveX}$ is less than CtrlPerCnt/2 is determined.

When $EPSD_{slaveX}$<CtrlPerCnt/2 (condition: Yes), the period count of the slave phase converter should be decreased in a next cycle: $PerCnt_{slaveX}$=CtrlPerCnt−$DeltaPerCnt_{slaveX}$ (block 522). Then $PS_{slaveX}$ will gradually move closer to $EPS_{slaveX}$ after some cycles.

When $EPSD_{slaveX}$≥CtrlPerCnt/2 (condition: No), the period count of the slave phase converter should be increased in a next cycle: $PerCnt_{slaveX}$=CtrlPerCnt+$DeltaPerCnt_{slaveX}$ (block 524). This will cause $PS_{slaveX}$ to move in an opposite direction, but it is a faster way to bring $PS_{slaveX}$ closer to $EPS_{slaveX}$, because $EPS_{slaveX}+360°$ phase shift is just the same as $EPS_{slaveX}$.

When the CtrlPerCnt from the controller is not changing in a steady-state condition, we expect all control signals to remain unchanged. However, the control signal of the slave phase converters may include jitter and will never reach a steady value. This is related to the value of $DeltaPerCnt_{slaveX}$. If $DeltaPerCnt_{slaveX}$ is a fixed small value, the jittering is not significant, but it may take a long time to achieve the expected phase shift after changing CtrlPerCnt. Vice versa, if $DeltaPerCnt_{slaveX}$ is a fixed big value, the jittering may never end, but the phase change is fast. In order to avoid continuous changes in $PerCnt_{slaveX}$ while CtrlPerCnt is not changing in a steady-state condition, it is suggested to set $DeltaPerCnt_{slaveX}$ to 0 if $PS_{slaveX}$ is very close to $EPS_{slaveX}$ within a certain limit PSLimit. This means:

If $EPSD_{slaveX}$<PSLimit, or $EPSD_{slaveX}$>(CtrlPerCnt−PSLimit),

Then $PerCnt_{slaveX}$=CtrlPerCnt (block 526).

And the fixed value of $DeltaPerCnt_{slaveX}$ should be less than PSLimit, otherwise the change of $PerCnt_{slaveX}$ will be too much that $EPSD_{slaveX}$ may never fall within PSLimit. However, a big PSLimit affects an accuracy of phase shift control.

In some preferred embodiments, in order to improve the phase shift change rate and unexpected jittering, it is suggested to use the variable $DeltaPerCnt_{slaveX}=K*EPSD_{slaveX}$. In this way, when $PS_{slaveX}$ is far from $EPS_{slaveX}$, the phase shift change rate is high, it is faster to make the phase shift closer to the expected value. At the same time, when the phase shift approaches the expected phase shift, the rate of change of the phase shift will gradually decrease, which improves the stability of the phase control.

A suitable value of K is important for the system performance. A higher K value will make a high phase shift change rate and faster to reach the expected phase shift, but it will cause a greater deviation between the slave phase converter $PerCnt_{slaveX}$ and CtrlPerCnt. This may affect the stability of the controller of the whole system. Vice versa, a lower K value has less impact on feedback control, but if CtrlPerCnt from the controller changes rapidly in different conditions, the expected phase shift may never be achieved. In some preferred embodiments, K is preferably a constant value between about 0.2 and about 0.4, for example.

Figure 6:
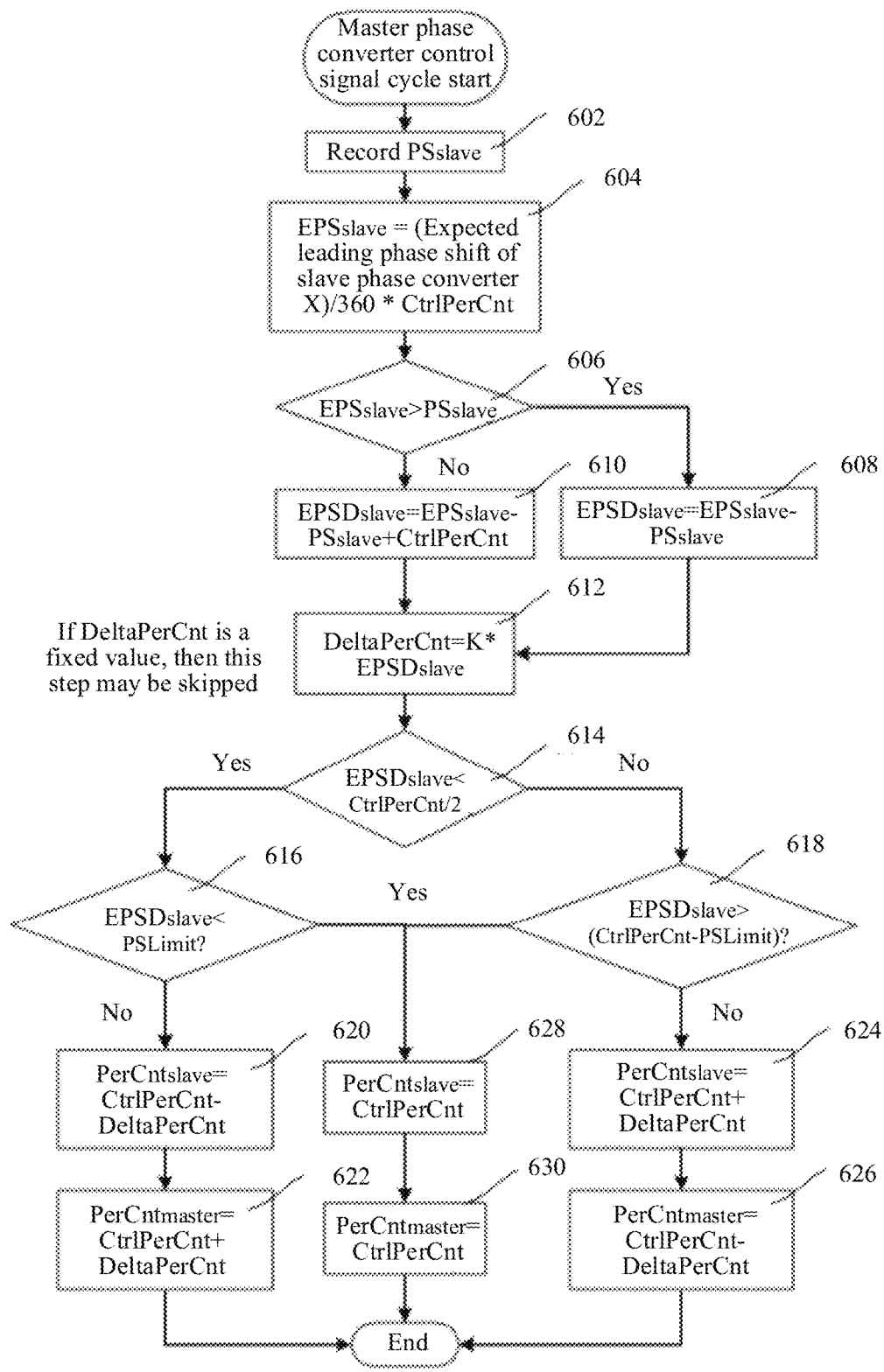
FIG. 6 shows a flowchart of an operation during each period of a master phase converter control signal in the presence of only one slave phase converter according to a preferred embodiment of the present invention.

FIG. 6 shows a flowchart of an operation during each period of a master phase converter control signal in the presence of only one slave phase converter according to a preferred embodiment of the present invention. Except for an operation related to the timer period count $PerCnt_{master}$ of the master phase converter, the operations in FIG. 6 are basically the same as the operations in FIG. 5, thus the same operations will not be repeated here.

According to a preferred embodiment of the present invention, if there are only two phase converters in the system, $PerCnt_{master}$ and $PerCnt_{slave}$ can be adjusted at the same time but in opposite directions. That is, after block 620, block 624, and block 628 in FIG. 6, a step for adjusting $PerCnt_{master}$ may be added.

When $EPSD_{slave}$<CtrlPerCnt/2,
$PerCnt_{master}$=CtrlPerCnt+DeltaPerCnt (block 620),
$PerCnt_{slave}$=CtrlPerCnt−DeltaPerCnt (block 622).
And when $EPSD_{slave}$≥CtrlPerCnt/2,
$PerCnt_{master}$=CtrlPerCnt−DeltaPerCnt (block 624),
$PerCnt_{slave}$=CtrlPerCnt+DeltaPerCnt (block 626).

In this case, an average value of $PerCnt_{master}$ and $PerCnt_{slave}$ is kept equal to CtrlPerCnt. An adverse effect of high K value (high DeltaPerCnt value) to the feedback control may be improved.

If $EPSD_{slave}$<PSLimit, or $EPSD_{slave}$>(CtrlPerCnt−PSLimit),
Then
$PerCnt_{slave}$=CtrlPerCnt (block 628),
$PerCnt_{master}$=CtrlPerCnt (block 630).

Example preferred embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, may be implemented by computer program instructions that are performed by one or more computer circuits. These computer program instructions may be provided to a processor circuit of a general purpose computer circuit, a special purpose computer circuit, and/or other programmable data processing circuits to produce a machine, such that the instructions executed via the processor of the computer and/or other programmable data processing apparatuses transform and control transistors, values stored in memory locations, and other hardware components within such circuit to implement the functions/acts specified in the block diagrams and/or flowchart block(s), and thereby create apparatus (functionality) and/or structure for implementing the functions/acts specified in the block diagrams and/or flowchart block (s).

These computer program instructions may also be stored in a tangible computer readable medium, and the tangible computer readable medium may direct a computer or other programmable data processing apparatuses to function in a particular manner, such that the instructions stored in the computer readable medium produce a product including instructions which implement the function/act specified in blocks of the block diagrams and/or flowchart. Therefore, preferred embodiments of the present invention may be implemented in hardware and/or software (including firmware, resident software, micro-code, etc.) running on a processor such as a digital signal processor, and the processor may be collectively referred to as "a circuit", "a module", or variants thereof.

The references to "one preferred embodiment", "preferred embodiment", etc. in the present disclosure indicate that the described preferred embodiments may include a specific feature, structure, or characteristic, but not every preferred embodiment necessarily include the specific feature, structure, or characteristic. Furthermore, such phrases may not necessarily refer to the same preferred embodiment. In addition, when describing a specific feature, structure, or characteristic in combination with a preferred embodiment, it should be considered that implementing the feature, structure, or characteristic in combination with other preferred embodiments (whether explicitly described or not) is within the knowledge scope of those skilled in the art.

It should be understood that although the terms "first", "second", etc. may be used herein to describe various elements, these elements should not be limited by these terms. These terms are merely used to distinguish one element from another. For example, without departing from the scope of the present disclosure, the first element may be referred to as the second element, and similarly, the second element may be referred to as the first element. As used herein, the term "and/or" includes any and all combinations of one or more of the related listed items.

Without substantially departing from the principles of the present inventive concepts, many changes and modifications may be made to the preferred embodiments. All these changes and modifications are intended to be included herein within the scope of the inventive concepts. Therefore, the above-mentioned subject matter should be understood as illustrative rather than limited, and the examples of preferred embodiments are intended to cover all such modifications, enhancements, and other preferred embodiments that fall within the spirit and scope of the present inventive concept. Therefore, to the maximum extent permitted by law, the scope of the present inventive concept should be determined by the widest permissible interpretation of the present disclosure, including examples of preferred embodiments and equivalents thereof, and should not be restricted or limited to previous specific preferred embodiments.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method of controlling a converter apparatus including a first switching converter and at least one second switching converter connected in parallel between an input and an output and operable based on a first frequency modulation control signal and at least one second frequency modulation control signal, respectively, the method comprising:
    determining an updated period of the first frequency modulation control signal and of the at least one second frequency modulation control signal based on the output;
    for each second frequency modulation control signal of the at least one second frequency modulation control signal, at a beginning of each period of the first frequency modulation control signal, determining a phase shift of each second frequency modulation control signal relative to the first frequency modulation control signal, and changing a period of each second frequency modulation control signal based on the determined phase shift by:
        when a difference between the phase shift and a target phase shift exceeds a predetermined threshold, determining the period of each second frequency modulation control signal as the updated period increased or decreased by a predetermined amplitude; and
        when the difference between the phase shift and the target phase shift is less than or equal to the predetermined threshold, determining the period of each second frequency modulation control signal as the updated period.

2. The method according to claim 1, wherein, before determining the phase shift, the period of the first frequency modulation control signal is changed to the updated period.

3. The method according to claim 1, wherein determining the period of each second frequency modulation control signal as the updated period increased or decreased by the predetermined amplitude includes:
    determining the period of each second frequency modulation control signal as the updated period increased or decreased by a predetermined amplitude along a direction where the phase shift approaches the target phase shift at a next period.

4. The method according to claim 1, further comprising subtracting the phase shift from the target phase shift to obtain a phase difference EPSD, wherein if the EPSD is less than zero, the EPSD is converted to a value greater than zero by adding one updated period.

5. The method according to claim 1, wherein the predetermined amplitude is a fixed value less than the predetermined threshold.

6. The method according to claim 1, wherein the predetermined amplitude is variable.

7. The method according to claim 4, wherein the predetermined amplitude is obtained by multiplying K with a period corresponding to the EPSD, wherein K is a constant between 0 and 1.

8. The method according to claim 7, wherein K is a constant between about 0.2 and about 0.4.

9. The method according to claim 4, further comprising:
    when the EPSD is less than half of a phase shift corresponding to the updated period, determining the period of each second frequency modulation control signal as the updated period in response to the EPSD being less than the predetermined threshold, and determining the period of each second frequency modulation control signal as the period of the updated period decreased by the predetermined amplitude in response to the EPSD being greater than or equal to the predetermined threshold; and
    when the EPSD is greater than or equal to half of the phase shift corresponding to the updated period, determining the period of each second frequency modulation control signal as the updated period in response to the EPSD being greater than the phase shift corresponding to the updated period subtracted by the predetermined threshold, and determining the period of each second frequency modulation control signal as the updated period increased by the predetermined amplitude in response to the EPSD being less than or equal to the phase shift corresponding to the updated period subtracted by the predetermined threshold.

10. The method according to claim 1, wherein the at least one second switching converter includes only one second switching converter between the input and the output, the method further includes:
    after determining the period of the second frequency modulation control signal as the updated period increased or decreased by the predetermined amplitude, determining the period of the first frequency modulation control signal as the updated period decreased or increased by the predetermined amplitude; and
    after determining the period of the second frequency modulation control signal as the updated period, determining the period of the first frequency modulation control signal as the updated period.

11. The method according to claim 10, further comprising:
    after determining the period of the second frequency modulation control signal as the updated period decreased by the predetermined amplitude, determining the period of the first frequency modulation control signal as the updated period increased by the predetermined amplitude; and
    after determining the period of the second frequency modulation control signal as the updated period increased by the predetermined amplitude, determining the period of the first frequency modulation control signal as the updated period decreased by the predetermined amplitude.

12. The method according to claim 1, wherein the first frequency modulation control signal and the at least one second frequency modulation control signal are generated using separate timers, respectively.

13. A converter apparatus comprising:
a first switching converter and at least one second switching converter connected in parallel between an input and an output, and operable based on a first frequency modulation control signal and at least one second frequency modulation control signal, respectively; and
a controller configured or programmed to:
determine an updated period of the first frequency modulation control signal and of the at least one second frequency modulation control signal based on the output;
for each second frequency modulation control signal of the at least one second frequency modulation control signal, at a beginning of each period of the first frequency modulation control signal, determine a phase shift of each second frequency modulation control signal relative to the first frequency modulation control signal, and change the period of each second frequency modulation control signal based on the determined phase shift by:
when a difference between the phase shift and a target phase shift exceeds a predetermined threshold, determining the period of each second frequency modulation control signal as the updated period increased or decreased by a predetermined amplitude; and
when the difference between the phase shift and the target phase shift is less than or equal to the predetermined threshold, determining the period of each second frequency modulation control signal as the updated period.

14. The converter apparatus according to claim 13, wherein before the controller is configured or programmed to determine the phase shift, the period of the first frequency modulation control signal is changed to the updated period.

15. The converter apparatus according to claim 13, wherein the controller is further configured or programmed to:
determine the period of the second frequency modulation control signal as the updated period increased or decreased by a predetermined amplitude along a direction where the phase shift approaches the target phase shift at a next period.

16. The converter apparatus according to claim 13, wherein the controller is further configured or programmed to:
subtract the phase shift from the target phase shift to obtain a phase difference EPSD;
wherein if the EPSD is less than zero, the EPSD is converted to a value greater than zero by adding one updated period.

17. The converter apparatus according to claim 13, wherein the predetermined amplitude is a fixed value, wherein the fixed value is less than the predetermined threshold.

18. The converter apparatus according to claim 13, wherein the predetermined amplitude is variable.

19. A non-transitory computer readable medium including a computer program stored thereon, wherein the computer program includes instructions, when executed by a processing circuit of a controller, cause the controller to perform the method according to claim 1.

* * * * *